United States Patent
Venken et al.

(10) Patent No.: US 7,324,446 B2
(45) Date of Patent: Jan. 29, 2008

(54) COMMUNICATION METHOD, RELATED BUFFERING ELEMENT AND LINE TERMINATION ELEMENT

(75) Inventors: Kristiaan Johan Hubert Ghislanus Venken, Schilde (BE); Stefaan Jozef De Cnodder, Lille (BE)

(73) Assignee: Acatel, Paris (FR)

(*) Notice: Subject to any disclaimer, the term of this patent is extended or adjusted under 35 U.S.C. 154(b) by 1208 days.

(21) Appl. No.: 09/925,331

(22) Filed: Aug. 10, 2001

(65) Prior Publication Data

US 2002/0024933 A1   Feb. 28, 2002

(30) Foreign Application Priority Data

Aug. 22, 2000   (EP)   .................... 00402332

(51) Int. Cl.
*G06F 11/00* (2006.01)
*H04L 12/54* (2006.01)

(52) U.S. Cl. .............. 370/231; 370/236.1; 370/428

(58) Field of Classification Search ...... 370/229–236.1, 370/428–429, 412–417, 536; 710/29, 52, 710/57, 60
See application file for complete search history.

(56) References Cited

U.S. PATENT DOCUMENTS

| | | | | |
|---|---|---|---|---|
| 5,493,566 A | * | 2/1996 | Ljungberg et al. | 370/231 |
| 5,745,477 A | * | 4/1998 | Zheng et al. | 370/230 |
| 5,784,358 A | * | 7/1998 | Smith et al. | 370/230 |
| 6,072,775 A | * | 6/2000 | Ikeda | 370/236 |
| 6,094,418 A | * | 7/2000 | Soumiya et al. | 370/231 |
| 6,097,697 A | * | 8/2000 | Yao et al. | 370/230 |
| 6,243,358 B1 | * | 6/2001 | Monin | 370/229 |
| 6,252,849 B1 | * | 6/2001 | Rom et al. | 370/230 |
| 6,252,851 B1 | * | 6/2001 | Siu et al. | 370/236 |
| 6,452,905 B1 | * | 9/2002 | Smith et al. | 370/236.1 |

FOREIGN PATENT DOCUMENTS

| | | |
|---|---|---|
| EP | 0 648 034 A1 | 9/1993 |
| EP | 0 957 654 A1 | 11/1999 |
| WO | WO 97/19567 | 5/1997 |

OTHER PUBLICATIONS

"TCP/IP—Friendly APON MAC with Traffic Regulator", K. Venken et al., Key Theme T5.
"A Versatile RED-based Buffer Management Mechanism for the Efficient Support of Internet Traffic", J. Nelissen et al., Alcatel Corporate Research Center paper.
"Random Early Detection Gateways for Congestion Avoidance", S. Floyd et al., IEEE/ACM Transactions Aug., 1993, No. 4, New York.

* cited by examiner

*Primary Examiner*—Afsar Qureshi
(74) *Attorney, Agent, or Firm*—Sughrue Mion, Pllc.

(57) ABSTRACT

The present invention relates to a communication method, and related buffering and line termination elements to be used in a communication network. The communication network includes a buffering element, a line termination element and several network termination elements. The buffering element is coupled to the line termination element, and the line termination element is coupled to each of the network termination elements over a shared medium. The buffering element and the line termination element interact in such a way that the line termination element adjusts a cell input/output rate of the buffering element to bandwidth related conditions of the network termination elements, or vice versa.

16 Claims, 3 Drawing Sheets

COMMUNICATION METHOD, RELATED BUFFERING ELEMENT AND LINE TERMINATION ELEMENT

BACKGROUND OF THE INVENTION

The present invention relates to a communication method to be used in a communication network comprising a buffering element, a line termination element and a plurality of network termination elements, wherein the buffering element is coupled to the line termination element, and the line termination element is coupled to each of the network termination elements over a shared medium.

Such a communication method is already known in the art, e.g., from "*TCP/IP friendly APON MAC with traffic regulator*" from the authors K. Venken et al. This article is published in Proceedings of the 17th World Telecommunications Congress, WTC/ISS2000, 7-12 May 2000, Birmingham.

Therein, a shared medium access network is described. The main function of such a shared-medium access network is to collect and multiplex traffic from several users and offer it to the core network and additionally to distribute the traffic from the core network to the relevant users. This involves the multiplexing and de-multiplexing of several connections. Typically, the access network has a point to multi-point topology where all traffic between the Network Terminations called the Optical Network Unit in the cited article and the core network flows through the line termination called the optical line termination of the access network in the cited article. Cells are broadcast in the downstream direction from line termination towards the Network Terminations. Multiple network terminations share the upstream direction as well as in the downstream direction. Therefore, a Medium Access Control further referred to as MAC function is needed for controlling the upstream channel. Centrally controlled request-based MAC protocols for Time Division Multiple Access transport systems are very well known. One time-slot corresponds with one cell. Different timeslots are dynamically assigned to different network terminations, under control of the MAC function implemented at the line termination.

The allocation of time-slots is based on the traffic parameters, i.e., connection set-up information, and the Quality of Service requirements of the connections. Dynamic bandwidth allocation also takes into account the instantaneous traffic-needs of the connections, e.g., the number of waiting cells at the network terminations. The MAC-channel consists of the requests of the network terminations sent to the line termination and the permits broadcast from line termination to the network terminations.

Additionally, it is well known in the art that the core network contains network elements, as described in "*A versatile RED based Buffer Management Mechanism for the efficient Support of Internet Traffic*" from the authors J. Nelissen and S. De Cnodder and published in November 1999 in Proc. SPIE Vol. 3842, p. 57-68, Internet II: Quality of service and future directions by R. O. Onvural et al. having limited buffering capabilities together with buffer acceptance capabilities, meaning that these network elements discard and/or mark incoming cells based on the filling degree of such a buffering element.

As a consequence, in case cells are discarded by such a buffering element in the core network, the sending of this same discarded cell over the shared medium between the network terminations, and the line termination was superfluous in the meaning that instead a competing cell not to be discarded could have been sent.

BRIEF SUMMARY OF THE INVENTION

An aspect of the present invention is to provide a communication method of the above known type, but the sending of data over the shared medium between the network terminations and the line termination element is done more efficiently.

According to the present invention, this aspect is achieved by a communication method for a communication network comprising a buffering element, a line termination element and a plurality of network termination elements, wherein the buffering element being coupled to the line termination element, and the line termination element is coupled to each of the network termination elements over a shared medium, wherein the communication method interacts between the buffering element and the line termination element to adjust a cell input/output rate of the buffering element to at least one bandwidth related condition of each of the network termination elements, or vice versa.

In this way, by enabling an interaction between the buffering element and the line termination element, to adjust the cell input/output rate of the buffering element, i.e., for instance a cell filling level of the buffering element, to at least one bandwidth related condition of the network termination elements or vice versa. The at least one bandwidth related conditions are conditions of the network terminations, such as dimensions of network termination buffer, corresponding configuration, connection information or queue size at the network termination elements. Hence, the data cells that are sent over the shared medium between the network terminations and the line termination are not discarded in the buffering element since their transmission is anticipated and the input/output rate is adapted in such a way that the transmission is always possible. Consequently, these data cells are not sent superfluously, over the shared medium increasing in such way the efficiency of data sending over the shared medium.

It is to be noticed that with a cell not only is referred to an ATM-cell but any kind of data-packet is meant whether fixed length or non-fixed length.

The line termination element notifies the buffering element to adjust the cell input/output rate of the buffering element to the bandwidth related conditions, of the network termination elements. The buffering element consequently adjusts this cell input/output rate by, for instance, discarding other incoming cells, such as other low priority cells, adapting the output rate or adjusting the threshold level, of course all in correspondence with the bandwidth related conditions of the network termination elements. Hence, the data cells that are sent over the shared medium between the network terminations and the line termination are not discarded in the buffering element and hence these data cells are not sent superfluously, over the shared medium increasing in such way the efficiency of data sending over the shared medium.

The buffering element notifies the line termination element to adjust the bandwidth related conditions, such as dimensions of network termination buffer, corresponding configuration, connection information or queue size at the network termination elements, of the network termination elements, to the cell input/output rate of the buffering element. The buffering element only possesses a limited buffering capacity. To optimally use this capacity without requiring the buffer acceptance mechanism to discard or mark cells of the cell stream, the buffering element notifies the line termination element to allocate more or less bandwidth to each or certain of the network termination elements in this way adjusting the bandwidth related condition of the network terminations. Hence, the data cells that are sent over the shared medium between the network terminations and the line termination are not discarded in the buffering element and hence these data cells are not sent superfluously, over the shared medium increasing in such way the efficiency of data sending over the shared medium.

The present invention also relates to a buffering element and a line termination realizing the above described communication method.

The line termination element notifies the buffering element to adjust the execution of the buffer acceptance mechanism based on conditions of the network termination elements such as dimensions, configuration, connection information or queue size at the network termination elements. The buffering element uses this notification together with a measured cell input/output ratio of the buffering part to instruct the buffer acceptance mechanism to act in such a way that, the buffering element consequently allocates a corresponding amount of space of the buffering part in correspondence with these conditions of the network termination elements.

Hence, the data cells that are sent over the shared medium between the network terminations and the line termination are not discarded in the buffering element and hence these data cells are not sent superfluously, over the shared medium increasing in such way the efficiency of data sending over the shared medium.

The criterion is a characteristic of the input flow of the buffering part or a cell filling level of the buffering part. Each criterion can be used for deriving an instruction for a policing part to discard or mark cells sent to the buffering element.

The condition interpreting part is able to derive a bandwidth allocation for the network termination elements based on a condition of the network termination elements or is adapted to transparently pass a condition of the network termination elements for inclusion in a notification of the buffering element in order to instruct the buffer acceptance mechanism to act in such a way that, the buffering element consequently allocates a corresponding amount of space of the buffering part in correspondence with such a condition of the network termination elements.

The present invention also relates to a buffering element and a line termination realizing the above described communication method.

The buffering element notifies the line termination element of a measured cell input/output ratio of the buffering part in order to adjust the bandwidth allocated to each of the network termination elements in accordance with this measured cell input/output ratio of the buffering part. The line termination element uses this notification together with conditions of the network termination elements to reallocate bandwidth to each or certain of the network termination elements. Hence, the data cells that are sent over the shared medium between the network terminations and the line termination are not discarded in the buffering element and hence these data cells are not sent superfluously, over the shared medium increasing in such way the efficiency of data sending over the shared medium.

The criterion is a characteristic of the input flow of the buffering part or a cell filling level of the buffering part. Each criterion can be used for deriving an instruction for a policing part to discard or mark cells sent to the buffering element.

The criterion is a characteristic of the input flow of the buffering part or a cell filling level of the buffering part. Each criterion can be used for deriving an instruction for a policing part to discard or mark cells sent to the buffering element.

BRIEF DESCRIPTION OF THE DRAWINGS

The above and other aspects and features of the invention will become more apparent and the invention itself will be best understood by referring to the following description of an embodiment taken in conjunction with the accompanying drawings wherein.

DETAILED DESCRIPTION OF THE INVENTION

Figure 1:
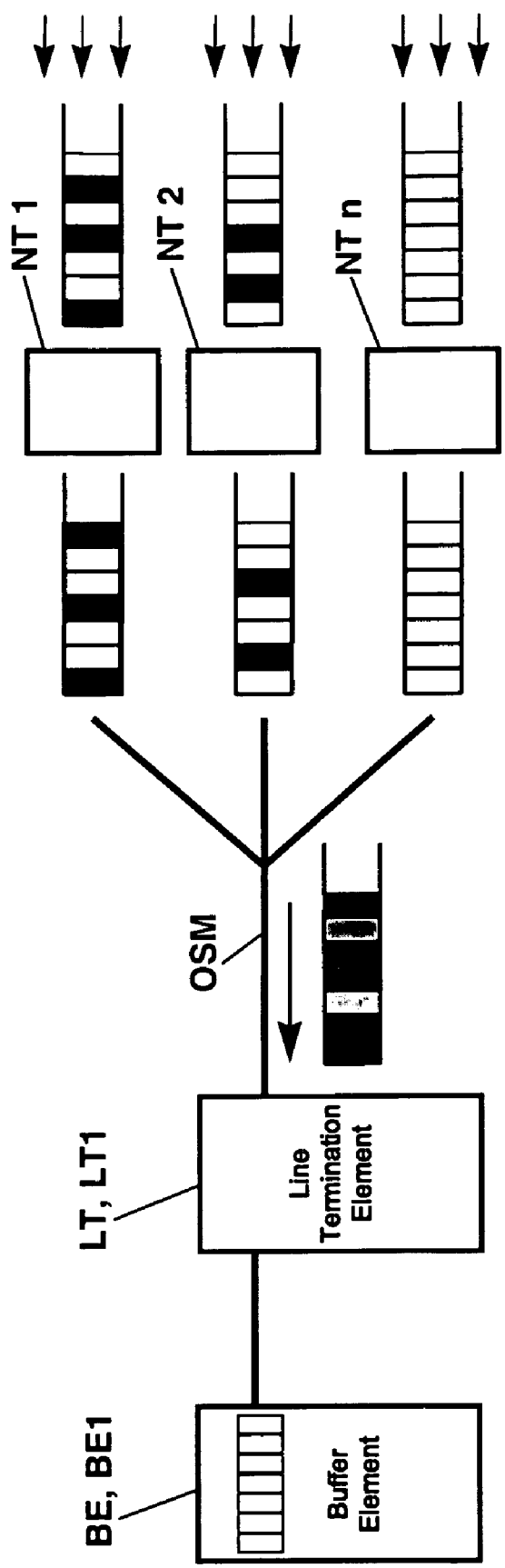
FIG. 1 represents an optical medium access network together with buffering element making part of the core network wherein the communication method of the present invention is executed.

In the following paragraphs, referring to the drawings, two implementations of the method and related devices of the present invention will be described. In the first paragraph of this description, the main elements of the communications network as presented in FIG. 1, wherein the communication method is executed, are described. This part is succeeded by a description of all interconnections of the before mentioned network elements. In the subsequent paragraphs, at first the structural built up of the line termination element LT and the buffering element BE is described followed by all interconnections and next the second embodiment is described in the same way as the first embodiment. In the following paragraph, the actual execution of both implementations of the communication method are described.

The essential elements of this communication network CN of the present invention is an optical medium access network, comprising an optical line termination element LT, LT1 and a number of optical network termination elements $NT_1$, $NT_2$, $NT_n$ and additionally there is a buffering element BE, BE1 within the core network.

The buffering element BE, BE1 is coupled to the line termination element LT, LT1 over a packet switched network such as an ATM network or an IP network, and the line termination element LT, LT1 further is coupled to each of the network termination elements $NT_1$, $NT_2$, $NT_n$ via an optical shared medium OSM.

Figure 2:
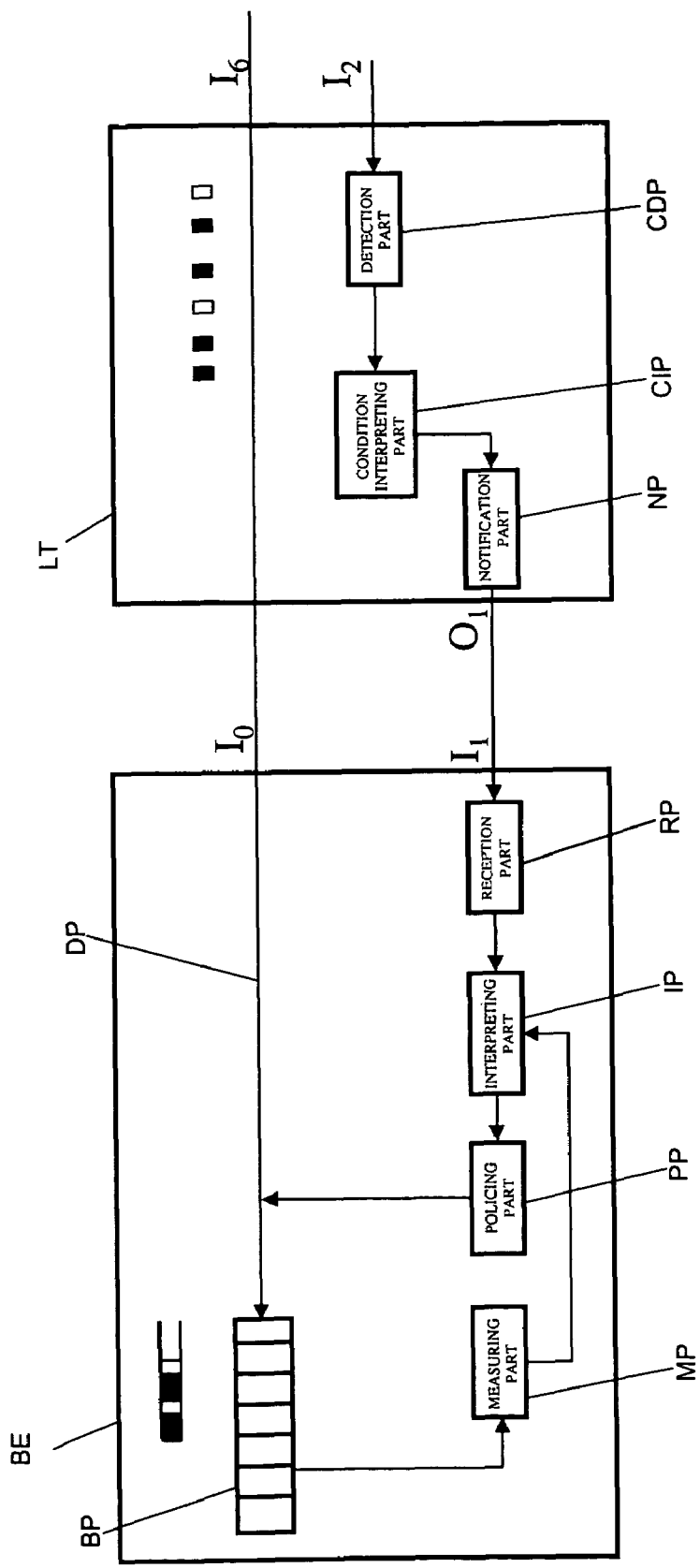
FIG. 2 represents the structural built-up of the buffering element BE and the line termination element LT as presented in FIG. 1 implementing a first embodiment.

The line termination element LT as presented in FIG. 2 contains a detection part CDP that is adapted to detect conditions for each of the network termination elements $NT_1$, $NT_2$, $NT_n$ by polling. These conditions for each network termination element $NT_1$, $NT_2$, $NT_n$ for instance are connection set-up information, Quality of Service requirements of connections or instantaneous traffic needs of connections. The line termination element further contains a condition interpreting part CIP that is adapted to derive an interpretation of these conditions of the network termination elements $NT_1$, $NT_2$, $NT_n$. Additionally, there is a notification part NP that is able to notify the buffering element BE of the interpretation of the conditions of the network termination elements $NT_1$, $NT_2$, $NT_n$.

The buffering element, as presented in FIG. 2, comprises a reception part RP that is adapted to receive a notification of the line termination LT on the interpretation of the conditions of the network termination elements $NT_1$, $NT_2$, $NT_n$, a buffering part BP that is adapted to store cells, sent to the buffering element and a measuring part MP that is adapted to detect if a cell filling level of this buffering part BP is exceeding a threshold value. Further, the buffering element BE comprises an interpreting part IP that is able to interpret the received notification on the interpretation of the conditions of the network termination elements $NT_1$, $NT_2$, $NT_n$ together with the cell filling level exceeding a threshold value of the buffering part BP and subsequently to derive therefrom an instruction for the policing part PP whether or not to discard or mark the cells sent to the buffering element BE. Further there is a policing part PP that is able to discard or mark the cells sent to the buffering element BE based on based on instructions of the interpreting part IP.

The line termination element LT has an input-terminal $I_2$ that is at the same time an input-terminal of the detection part CDP. The detection part CDP is coupled with an output-terminal to an input-terminal of condition interpreting part CIP, which is coupled with an output-terminal to an input-terminal of the notification part NP. Further, the notification part NP has an output-terminal that is at the same time an output-terminal $O_1$ of the line termination element LT. The data-path DP couples the input-terminal $I_6$ of line termination LT to the input-terminal $I_0$ of the buffering element BE that at the same time is an input-terminal of the buffering part BP. Additionally the buffering part BP is coupled with an output-terminal to an input-terminal of the measuring part MP that is coupled with an output-terminal to an input terminal of the interpreting part IP. The policing part PP has an input-terminal that is coupled to an output-terminal of the interpreting part IP and an output-terminal that is coupled to an input terminal of the buffering part BP. The interpreting part IP is coupled with an input terminal to an output-terminal of the reception part RP. The reception part RP has an input-terminal that is at the same time an input-terminal $I_1$ of the buffering element BE.

In order to explain the execution of the first embodiment of the present invention it is assumed that the detection part CDP detects certain conditions of each of the network termination elements, such as an agreed upon Quality of Service of a connection from network termination elements $NT_1$ and an instantaneous traffic need of the connection towards network termination elements $NT_2$. These conditions are forwarded to the condition interpreting part CIP, in this case a medium access control protocol that is able to allocate bandwidth to each network termination elements $NT_1$, $NT_2$, $NT_n$ based on these conditions. The condition interpreting part CIP forwards the information concerning the allocated bandwidth and eventually information concerning the certain conditions of each of the network termination elements to the notification part NP that next sends a notification of the information concerning the allocated bandwidth and eventually information concerning the certain conditions of each of the network termination elements to the buffering element BE. Subsequently, the reception part RP of the buffering element BE receives the notification of the line termination LT on the information concerning the allocated bandwidth and eventual information concerning the certain conditions of each of the network termination elements and forwards the notification to the interpreting part IP that next interprets the notification. Based hereon together with the actual buffer filling status determined by the measuring part MP, the interpreting part PP instructs the policing part whether or not to discard cells sent to the buffering element in order to also reserve buffer space in the buffering part BP of the buffering element BE for the cells sent using the allocated bandwidth.

Figure 3:
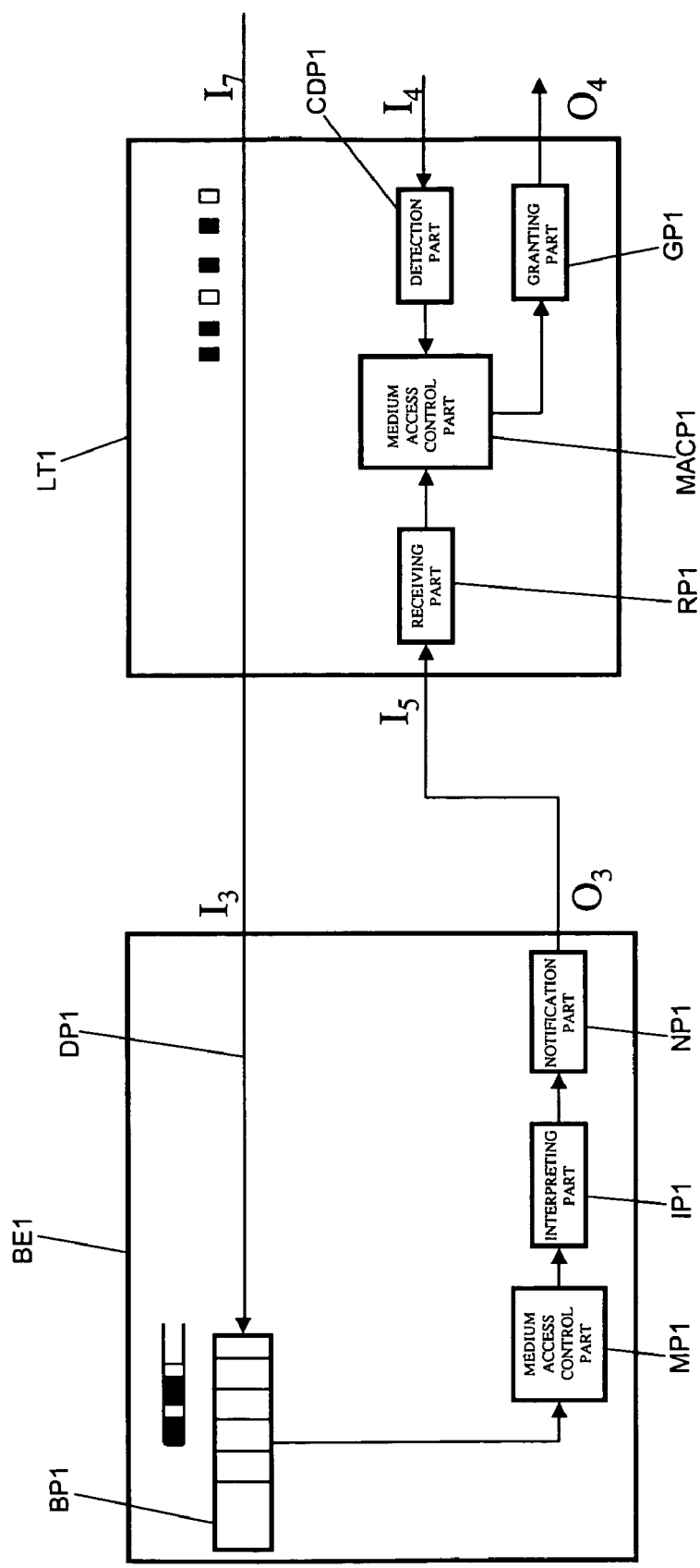
FIG. 3 represents the structural built-up of the buffering element BE1 and the line termination element LT1 as presented in FIG. 1 implementing a second embodiment.

The buffering element BE1 as presented in FIG. 3, comprises a buffering part BP1 that is adapted to store cells that are sent to the buffering element BE1, a measuring part MP1 that is adapted to detect if a cell filling level of this buffering part BP is exceeding a threshold value of the buffering part BP1. Further, there is an interpreting part IP1 that is adapted to interpret the cell filling level exceeding a threshold value and subsequently to forward this interpretation towards the notification part NP1 of the buffering element BE1 that notifies the line termination element LT1 of an exceeded threshold value.

The line termination element LT1 as presented in FIG. 3 contains a medium access control part MACP1 that is adapted to allocate bandwidth to each of the network termination elements $NT_1$, $NT_2$, $NT_n$ based on conditions of each network termination element $NT_1$, $NT_2$, $NT_n$, such as connection set-up information, Quality of Service requirements of connections or for instance instantaneous traffic needs of connections. The line termination element LT1 further contains a detection part CDP1 that is adapted to detect these conditions of each of the network termination elements $NT_1$, $NT_2$, $NT_n$. Additionally, there is a granting part GP1 that is adapted to send grants to each of the network termination elements $NT_1$, $NT_2$, $NT_n$. The number of grants refers to the amount of bandwidth that is allocated to each of the network termination elements $NT_1$, $NT_2$, $NT_n$. Further, there is a reception part RP1 that is able to receive the notification of the buffering element BE1 and forward this notification towards the medium access control part MACP1. The access control part MACP1 is additionally is adapted to reallocate bandwidth to each of the network termination elements based on the notification concerning the cell filling level of the buffering part BP1 of the buffering element BE1.

The data-path DPI couples the input-terminal $I_7$ of line termination LT to the input-terminal $I_3$ of the buffering element BE1 that at the same time is an input-terminal of the buffering part BP1. Additionally, the buffering part BP1 is coupled with an output-terminal to an input-terminal of the measuring part MP1 that is coupled with an output-terminal to an input terminal of the interpreting part IP1. The interpreting part IP1 is coupled with an output-terminal to an input terminal of the notification part NP1. The notification part NP1 has an output-terminal that is at the same time an output-terminal $O_3$ of the buffering element BE1.

The line termination element LT1 has an input-terminal $I_4$ that is at the same time an input-terminal of the detection part CDP1. The detection part CDP1 is coupled with an output-terminal to an input-terminal of the medium access control part MACP1 that with an output-terminal is coupled to an input-terminal of the granting part GP1 and additionally with an input-terminal is coupled to an output-terminal of the reception part RP1. The granting part GP1 has an output-terminal that is at the same time an output-terminal $O_4$ of the line termination element LT1. Further, the reception part RP1 has an input-terminal that is at the same time an input-terminal $I_5$ of the line termination element LT1.

In order to explain the execution of the second embodiment of the present invention it is assumed that the cell filling level of the buffering part BP1 currently is above the threshold value meaning that newly arriving cells will not be admitted to the buffering part BP1 but are discarded in advance. The measuring part MP1 detects that the filling level of the buffering part exceeds the threshold value and subsequently forwards this to the interpreting part IP1 that interprets the exceeding of the threshold value and formulates a notification for the line termination element LT1 based hereon. The notification part NP1 next notifies the line termination element LT1 of the cell filling level exceeding the threshold value and the corresponding cell filling level of the buffering part BP1. The reception part RP1 receives the notification of the buffering element BE1 and forwards it to the medium access control part MACP1 that reallocates the bandwidth on the optical shared medium OSM to each of the network termination elements based on the notification of the exceeded threshold level. The bandwidth is in such a way reallocated to each of the network termination elements $NT_1$, $NT_2$, $NT_n$ that the network termination elements $NT_1$, $NT_2$, $NT_n$ sending towards buffering element BE1 are limited in sending cells in favor of the network termination elements sending to other not presented buffering elements. In this way, the capacity on the optical shared medium OSM is optimum used and, at the same time, the buffering element BE1 is not overloaded resulting in a cell discard at this buffering element BE1.

It is to be remarked that the measuring part MP, MP1 in both embodiments is able to measure other parameters then the previously described one, such as characteristics of the cell input flow of the buffering part or some flow output characteristics of the buffering element.

Additionally, it is to be remarked the condition interpreting part CIP, in case of the first embodiment, may transparently forward the condition information to the buffering element in for interpretation by the interpreting part IP of the line termination LT. For instance, the queue-length of the network terminations may be used directly in the line termination for deriving an instruction for the policing part.

It is further to be remarked that in case of a low cell filling level of the buffering element BE1 the method performs also the other way round and is adapted to instruct the line termination element LT1 to allocate bandwidth in such a way that the cell filling level of the buffering element BE1 increases to an optimum value in this way optimizing the efficiency.

Additionally, it is to be remarked that the application of the present invention is not restricted to optical networks but may be applied in any shared medium network such as wireless networks or Hybrid Fiber Coax networks.

Although the above embodiment of the invention has been described by means of functional blocks, their detailed realization based on this functional description should be obvious for a person skilled in the art and is therefore not described.

While the principles of the invention have been described above in connection with specific apparatus, it is to be clearly understood that this description is made only by way of example and not as a limitation on the scope of the invention, as defined in the appended claims.

The invention claimed is:

1. A communication method for a communication network comprising a core network, a buffering element, a line termination element and a plurality of network termination elements, said buffering element coupled to said line termination element via said core network, and said line termination element coupled to each of said network termination elements over a shared medium separate from said core network, wherein said communication method comprises interacting between said buffering element and said line termination element to adjust a cell input/output rate of said buffering element to at least one bandwidth related condition of each of said network termination elements, wherein said line termination element notifies said buffering element to adjust said cell input/output rate of said buffering element to said at least one bandwidth related condition of said network termination elements.

2. The communication method according to claim 1, wherein said buffering element adjusts said cell input/output rate in response to said notifying without impact on a rate of transmission between said line termination element and said network termination elements.

3. A communication method for a communication network comprising a core network, a buffering element, a line termination element and a plurality of network termination elements, said buffering element coupled to said line termination element via said core network, and said line termination element coupled to each of said network termination elements over a shared medium separate from said core network, wherein said communication method comprises interacting between said buffering element and said line termination element to adjust a cell input/output rate of said buffering element to at least one bandwidth related condition of each of said network termination elements, wherein said buffering element notifies said line termination element to adjust said at least one bandwidth related condition of said network termination elements to said cell input/output rate of said buffering element.

4. A buffering element to be used in a communication network, said communications network comprising a core network, a line termination element and a plurality of network termination elements, said buffering element being coupled to said line termination element via said core network, and said line termination element being coupled to each of said network termination elements over a shared medium separate from said core network, said buffering element comprises:
    a buffering part adapted to store cells sent to said buffering element;
    a measuring part coupled with an input to an output of said buffering part and adapted to determine a criterion based on a cell input/output rate of said buffering part;
    an interpreting part coupled with an input to an output of said measuring part and adapted to interpret said criterion based on said cell input/output rate of said buffering part and being adapted to derive therefrom an instruction for a policing part whether or not to discard or mark said cells sent to said buffering element,
    a policing part coupled with an input to an output of said interpreting part and adapted to discard or mark said cells sent to said buffering element, based on said instruction of said interpreting part, wherein said buffering element further comprises:
    a reception part coupled with an output to an input of said interpreting part and adapted to receive a notification of said line termination containing an interpretation of at least one condition of each of said network termination elements, and that said interpreting part is adapted to derive said instruction from said notification of said line termination on said interpretation of said at least one condition of each of said network termination elements.

5. The buffering element according to claim 4, wherein said criterion is a characteristic of cells sent to said buffering element.

6. The buffering element according to claim 4, wherein said criterion is a filling level of said buffering part.

7. A line termination element to be used in a communication network, said communication network comprising a core network, a buffering element and a plurality of network termination elements, said buffering element being coupled to said line termination element via said core network, and said line termination element being coupled to each of said network termination elements over a shared medium separate from said core network, said line termination element comprising:
- a detection part adapted to detect at least one condition of each of said network termination elements; and
- a condition interpreting part coupled with an input to an output of said detection part and adapted to derive an interpretation of said at least one condition of each of said network termination elements, wherein said line termination element further comprises:
- a notification part coupled with an input to an output of said condition interpreting part and adapted to notify said buffering element of said interpretation of said at least one condition of each of said network termination elements.

8. The line termination element according to claim 7, wherein said condition interpreting part is adapted to derive a bandwidth allocation for each of said network termination elements based on said at least one condition of each of said network termination elements.

9. The line termination element according to claim 7, wherein said condition interpreting part is adapted to transparently pass said at least one condition of each of said network termination elements.

10. A buffering element to be used in a communication network, said communications network comprising a core network, a line termination element and a plurality of network termination elements, said line termination element adapted to allocate bandwidth to each of said network termination elements, said buffering element coupled to said line termination element via said core network, and said line termination element coupled to each of said network termination elements over a shared medium separate from said core network, said buffering element comprising:
- a buffering part adapted to store cells sent to said buffering element;
- a measuring part coupled with an input to an output of said buffering part and adapted to determine a criterion based on a cell input/output rate of said buffering part; and
- an interpreting part coupled with an input to an output of said a measuring part and adapted to generate an interpretation of said criterion based on said cell input/output rate of said buffering part, wherein said buffering element further comprises:
- a notification part coupled with an input to an output of said interpreting part and adapted to notify said line termination of said interpretation of said criterion based on said cell input/output rate of said buffering part.

11. The buffering element according to claim 10, wherein said criterion is a characteristic of cells sent to said buffering element.

12. The buffering element according to claim 10, wherein that said criterion is a cell filling level of said buffering part.

13. A line termination element to be used in a communication network, said communication network comprising a buffering element and a plurality of network termination elements, said line termination element being adapted to allocate bandwidth to each of said network termination elements, said buffering element being coupled to said line termination element, and said line termination element being coupled to each of said network termination elements over a shared medium, said line termination element comprising:
- a medium access control part adapted to allocate bandwidth to each of said network termination elements based on at least one condition of each of said each network termination element;
- a detection part coupled with an output to an input of said a medium access control part and adapted to detect said at least one conditions of each of said network termination elements; and
- a granting part coupled with an input to an output of said a medium access control part and adapted to send grants to each of said network terminations indicating that a certain amount of bandwidth is allocated to each of said network terminations, wherein said line termination element further comprises:
- a reception part coupled with an output to an input of said a medium access control part and adapted to receive a notification of an interpretation of a criterion based on a cell input/output rate of said buffering part, and that said medium access control part is adapted to allocate said bandwidth to each of said each network termination elements based on said notification of said buffering element.

14. The line termination element according to claim 13, wherein said criterion is a characteristic of cells sent to said buffering element.

15. The line termination element according to claim 13, wherein said criterion is a filling level of a buffering part of said buffering element.

16. A communication method for a communication network comprising a core network, a buffering element, a line termination element and a plurality of network termination elements, said buffering element coupled to said line termination element via said core network, and said line termination element coupled to each of said network termination elements over a shared medium separate from said core network, wherein said communication method comprises interacting between said buffering element and said line termination element to adjust a cell input/output rate of said buffering element to at least one bandwidth related condition of each of said network termination elements.

* * * * *